July 13, 1943. E. T. LARKIN 2,324,005
CONTROL SYSTEM FOR INTERNAL COMBUSTION ENGINES
Filed Aug. 2, 1940 3 Sheets-Sheet 1

INVENTOR.
Elwood T. Larkin
By Parker, Brchwod & Farmer.
ATTORNEYS

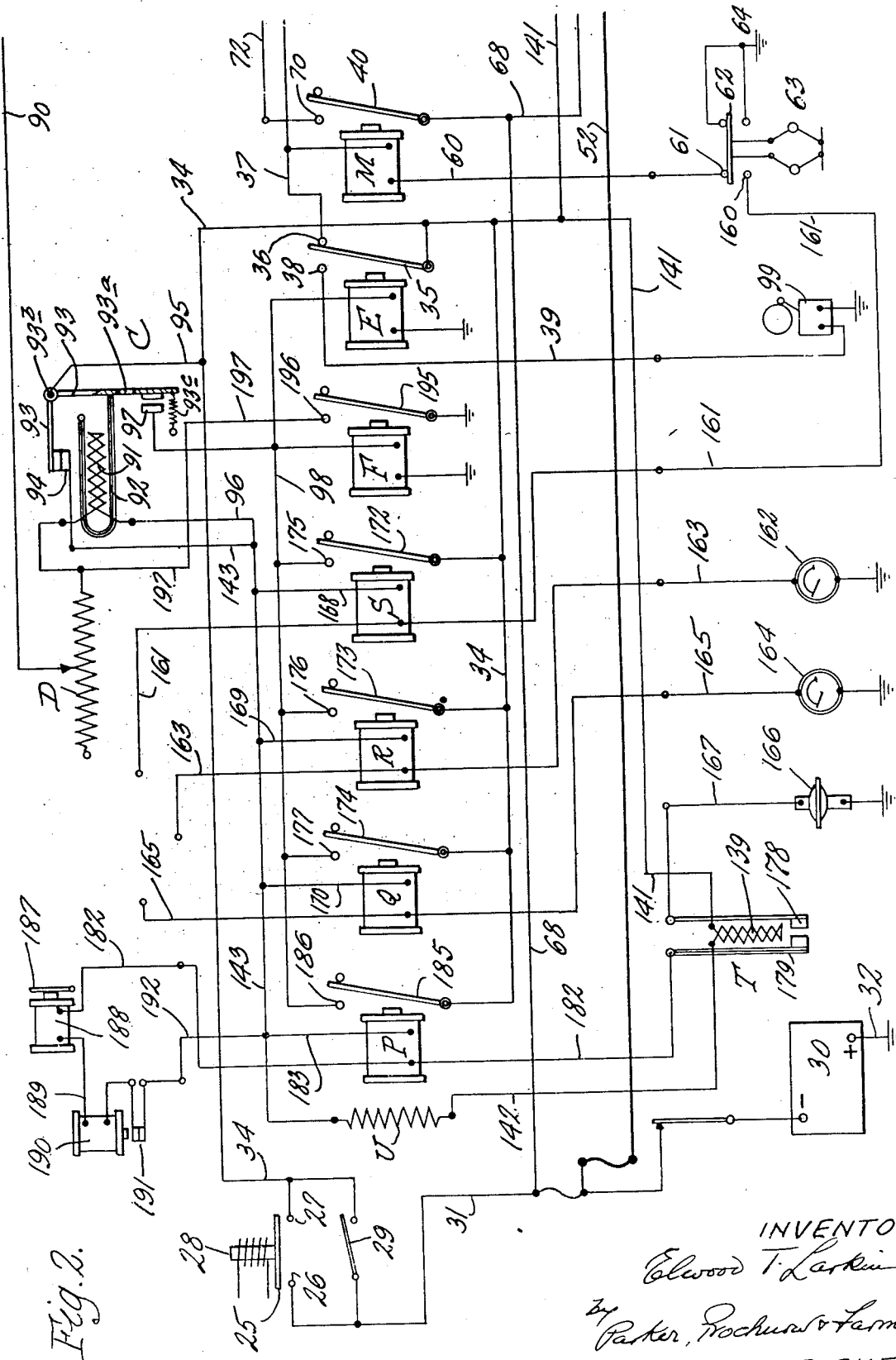

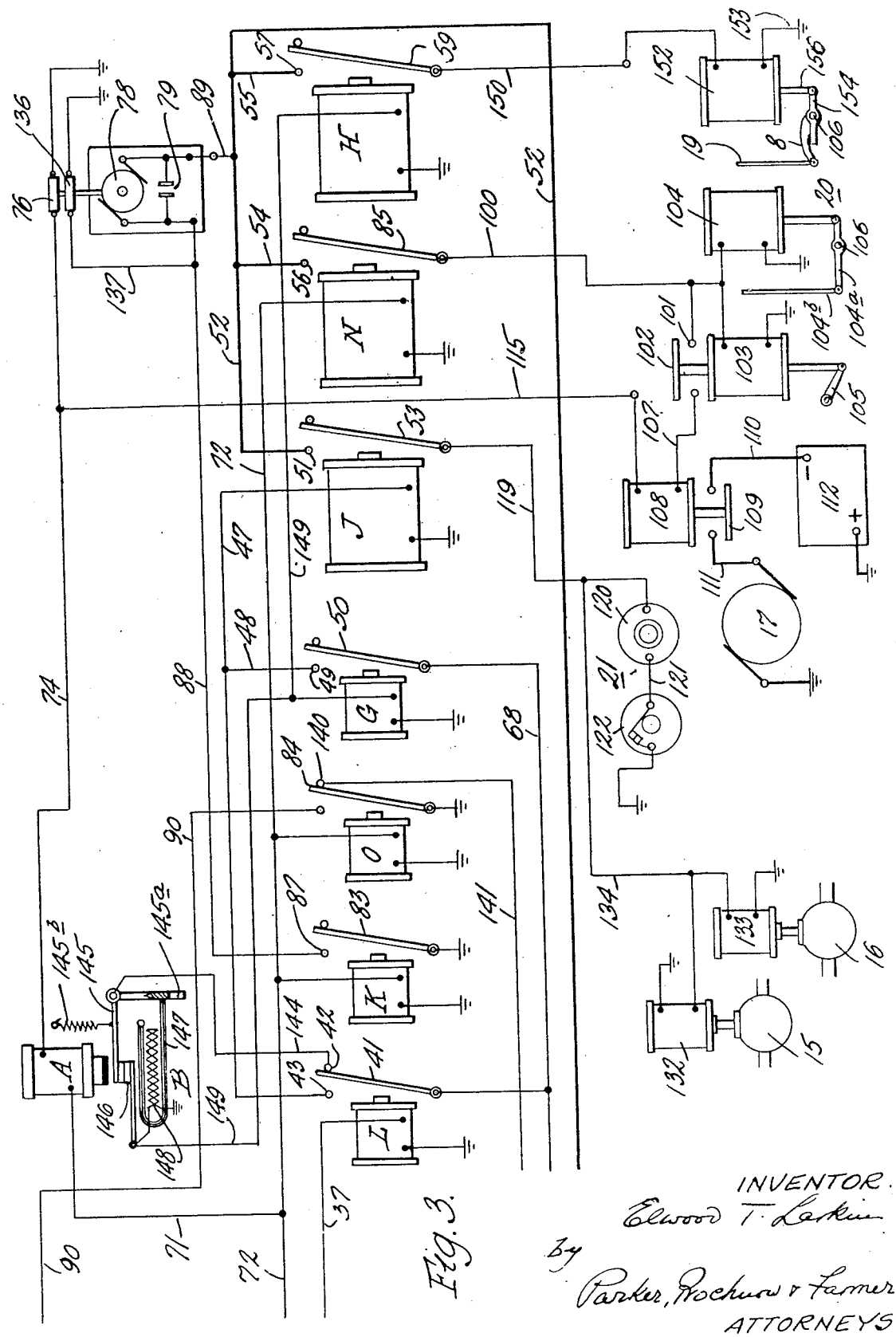

Patented July 13, 1943

2,324,005

UNITED STATES PATENT OFFICE 2,324,005

CONTROL SYSTEM FOR INTERNAL COMBUSTION ENGINES

Elwood T. Larkin, Amherst, N. Y., assignor to Sterling Engine Company, Buffalo, N. Y.

Application August 2, 1940, Serial No. 349,747

22 Claims. (Cl. 290—38)

This invention relates to systems for automatically controlling the starting, stopping and operation of an internal combustion engine. In my United States Patent No. 1,776,683, I have described an automatic controlling system of this type by means of which an internal combustion engine may be automatically started, operated and stopped by merely closing a switch, either manually or automatically. A system of this kind may, for example, be employed in conjunction with some other source of power in such a manner that in the event that said other source of power fails, the internal combustion engine will be automtically placed into operation, and again stopped when said other source of power resumes operation.

One of the objects of this invention is to provide an improved system of this kind.

It has also been found that if an engine has been running for a considerable period of time at or near its full load, parts of the engine exposed to the high temperatures of the burning gases in the cylinders may become heated to such an extent that if it is attempted to stop the engine merely by breaking the ignition circuit, the engine may at times continue to operate by causing ignition of incoming gases by the heated parts of the engine. Since this ignition may not take place at each cycle of the engine, there is considerable danger that unburned gases may pass into the exhaust system of the engine and become ignited, thus causing a dangerous explosion or fire.

It is, consequently, another object of this invention to provide an improved system of stopping the operation of an internal combustion engine in such a manner as to avoid these dangers. Another object is to provide an automatic control system for internal combustion engines in which means are provided for operating the engine at a reduced speed for a short period of time after the demand for power from the engine has ceased, to permit the engine to become cooled sufficiently to enable it to come to a normal stop. It is also an object of this invention to provide electrically operated means, which, when the engine is to be stopped, reduce the fuel supply to the engine and actuate a time relay, which after an interval of time breaks the ignition circuit of the engine.

It is a further object of this invention to provide, in a system of this kind, means for indicating certain conditions existing in the engine, in the event that the engine fails to start, so that an attendant can readily determine what repairs or adjustments may be necessary in order to enable the engine to start. It is also an object of this invention to provide a system of this kind with an annunciator which indicates one or more of the causes of failure of the engine to start or operate.

Another object of this invention is to provide a system of this kind with delayed or warp switches which, in case the engine or system is not operating under normal conditions, will delay the stopping of the engine or system for an interval of time sufficient to permit such conditions to become rectified.

A further object is to provide in a system of this kind, means for stopping the actuation of the starting or cranking motor after a period of time in case the engine fails to start.

Other objects will appear from the following description and claims.

In the accompanying drawings:

Fig. 2 is a diagrammatic view showing a part of the system embodying this invention.

Fig. 3 is a continuation of Fig. 2 showing, diagrammatically, the balance of the system.

Figure 1:
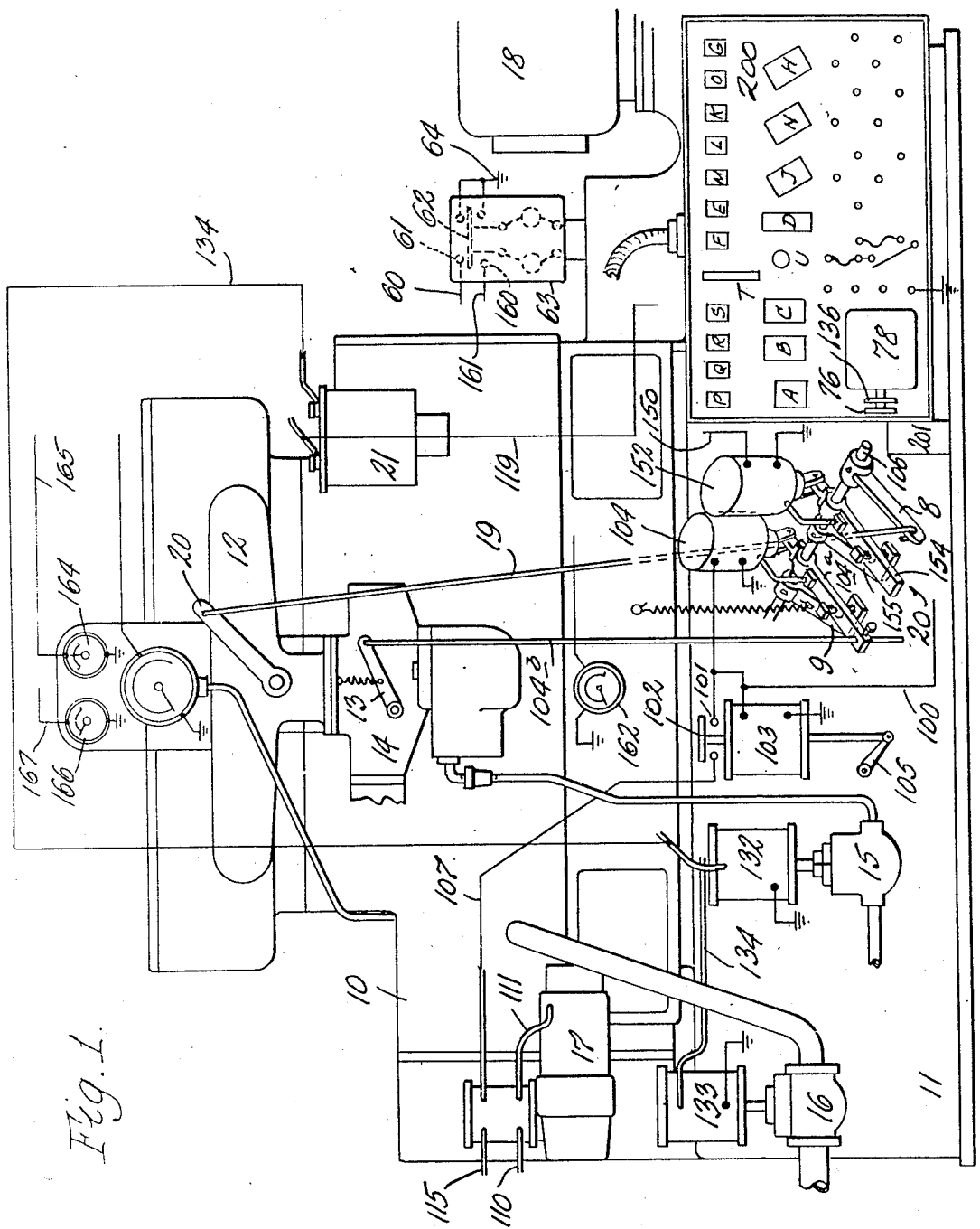
Fig. 1 is a diagrammtically represented side elevation of an engine having my improved system applied thereto.

In Fig. 1, 10 represents the cylinder block of an engine, 11 a base or support on which the engine is mounted, 12 the intake manifold leading to the cylinders of the engine, and 14 the carburetor. The flow of fuel to the carburetor may be controlled by means of a valve 15. If the engine is jacketed for the circulation of a cooling fluid, preferably a valve 16 is employed for turning on and shutting off the flow of cooling fluid to the engine jackets. 17 represents an electric starting motor which may be connected in any suitable manner to the engine, and 18 represents an electric generator driven by the engine in any usual or suitable manner for supplying electric current to the usual storage battery or batteries.

The usual throttle valve controlling the flow of combustible mixture to the intake manifold 12 may be operated by means of a throttle actuating device 20. 21 represents an ignition device for supplying the usual ignition current to the spark plugs of the engine.

The engine and the various parts thus far described are shown in the drawings merely by way of example, and it will be understood that my improved system may be operated in connection with any type of internal combustion engine, and that the various parts thus far described may be of any suitable construction, or may be replaced by equivalents. In order to avoid confusion, I have shown most of the electrical connections for actuating the various parts of the engine diagrammatically in Figs. 2 and 3. It is also to be understood that in connection with this improved system, I have shown various electrically operated devices for performing certain functions, but it will be understood that such devices are merely shown by way of example and may be replaced by others capable of performing the same functions, whether operated electrically, pneumatically, or by other power means.

25, Fig. 2, represents a control or master switch which may be actuated automatically to operate or interrupt the operation of my improved system by establishing a connection between two terminals 26 and 27. The switch shown may be operated by means of a solenoid or magnetic coil 28 in such a manner that when the coil is energized, the switch remains open, and when the coil is de-energized, the switch closes. Any other type of master switch may, of course, be employed, that shown being used mainly in cases where the main power is supplied by an electric motor, and in which the internal combustion engine is placed into operation when the supply of electric power to the motor fails. The solenoid 28, therefore, may be connected in a circuit receiving current from the main supply of current to the electric motor, so that when this supply of current fails, the master switch 25 will be automatically closed, and after the supply of current to the main driving motor is resumed, the master switch 25 will be moved by the solenoid 28 into open circuit position. The master switch may be constructed so that it can also be operated manually, or if desired, a manually operable switch 29 may be employed for operating the engine independently of the automatic switch, for example, for testing purposes.

The various devices employed in connection with my system are herein shown as actuated by means of electric current supplied from any suitable electrical supply source, such, for example, as a storage battery 30, one terminal of which is connected by means of a suitable conductor 31 to one terminal of each of the switches 25 and 29, the other terminal of the battery being grounded, as indicated at 32. The other terminal 27 of the master switch and also the other terminal of the hand-operated switch 29, if such switch is used, are connected to a conductor or supply main 34. This conductor 34 is connected with a movable switch or contact member 35 which forms a part of a relay actuated by means of a relay coil E, and which, when not attracted by the coil E, contacts with a terminal 36 to which a conductor 37 is connected, which in turn is connected by means of branch conductors to relay coils M and L shown in Figs. 2 and 3 respectively, so as to energize the same. These relay coils respectively actuate movable switch members or contact devices 40 and 41. The contact member 41 normally engages the terminal 42, but when the relay coil L is energized, the movable contact member 41 will engage with a terminal 43, which is connected by means of a conductor 47 to a relay coil J and by means of a branch conductor 48 to a terminal 49, associated with a relay coil G and adapted to be engaged by means of a movable contact member 50 when the coil G is energized.

When the relay coil J is energized by current conducted to it by the conductor 47, a movable contact member 53 is moved into engagement with a terminal 51 to which a conductor 52 is connected. This conductor 52 is connected by means of branch conductors 54 and 55 to terminals 56 and 57 respectively associated with relay coils N and H, and which terminals may be engaged by means of the movable contact or switch members 85 and 59 when these solenoids are energized. The conductor 52 is another main power supply line and, as shown in Fig. 2, is connected to the conductor 31 leading to a terminal of the battery 30.

When the relay coil M is energized, through the medium of the relay coil E, the current from the relay coil M passes through a conductor 60 to terminal 61 of a speed controlled switch 62 which is diagrammatically shown in Fig. 2 as actuated by a tachometer or centrifugal governor 63 operated by means of the engine in such a manner that when the engine is operating at low speeds, the switch 62 is closed so that a circuit is completed to the ground indicated at 64. As the speed of the engine reaches that at which it no longer requires the use of a starting motor, the circuit from the conductor 60 to the ground 64 is broken by the opening of the switch 62.

The relay coil M controls the movable switch member 40 connected to a conductor 68, which is in turn connected with the conductor 31 leading to a terminal of the battery 30. The movable switch member 40 normally is in open circuit position, but when the relay coil M is energized, the movable contact member 40 engages a terminal 70, and thus connects the conductor 68, receiving current from the battery 30, to a conductor 72, which in turn is connected to a conductor 71. The conductor 71 leads to one terminal of a coil of a post stop reset solenoid A, the other terminal of the coil being connected by means of conductor 74 to the ground through a cam 76 on the shaft of a cycle timing motor 78 which operates the cam 76 through a suitable speed reduction gearing (not shown). This motor controls the periods of operation of the starting motor of the engine so that the same will not operate continuously but at more or less regular intervals. This cycle timing motor may be replaced by other means for operating the starting motor at intervals for suitable periods of time. 79 represents a condenser in the circuit across the armature of the motor 78. The operation of the post stop solenoid A will be hereinafter further explained.

The conductor 72 extends to the relay coils K, O and N, so that movable contact members 83, 84 and 85 associated with the coils K, O and N will be moved to the left from the positions shown in Fig. 3, when these coils are energized, but when the engine has been started, the coil M will be de-energized by the speed controlled switch, thus de-energizing the coils K, O and N, so that the contact members 83, 84 and 85 will move back into the positions shown in Fig. 3.

When the movable contact member 83 is moved to the left by the energizing of the relay coil K, which takes place immediately upon closing of the master switch 25 or the hand switch 29, it contacts a terminal 87 connected by means of a conductor 88 to the cycle timing motor 78, this motor receiving current from the main supply line 52 through the branch conductor 89. This starts the operation of the cycle timing motor 78.

When the coil O is energized, the contact member 84 thereof is moved to the left in Fig. 3, thus making contact with a terminal connected with a conductor 90 which leads to an adjustable resistance D connected in series with a coil or element 91 of a time relay or warp switch C. This relay serves to control the period of time during which the starting motor may operate, in such a manner that after the starting motor has been intermittently operating for a period of time if the engine has not started, further operation of the starting or cranking motor will be interrupted. For example, the retarded relay may operate in such a manner as to permit the starting or cranking motor to operate for a period from three to five minutes and this period may be varied by adjusting the variable resistance D. The time relay or warp switch may be of any suitable or desired construction, that shown, by way of example, and more or less diagrammatically in the drawings, including thermo-responsive member 92, which may, for example, be a bimetallic thermostatic rod which is subjected to heat of the coil or element 91. The thermostatic rod shown is of U-shape and when subjected to heat the legs of the U-shaped rod separate. One of the legs is secured in fixed position and the other leg normally bears against one leg of a pivoted rock arm 93 having an aperture or slot 93a therein. The rock arm 93 is pivoted at 93b and a spring 93c normally holds the rock arm in engagement with the movable end of the thermostatic member 92. While in this position, the other end of the rock arm engages a contact or terminal 94. Consequently, when the heat of the coil or element 91 causes the thermo-responsive member 92 to spread its legs apart and the movable leg enters the hole or slot 93a, the spring 93c swings the rock arm about its pivot 93b, so that the rock arm moves out of engagement with the terminal 94. 95 represents a conductor which connects the rock arm 93 with the power line 34 leading to the battery through the master switch 25. When the relay coil O is energized and the parts of the warp switch are in the position shown in Fig. 2, the conductor 90 is connected to the ground through the contact device 84 and the current is supplied to the coil 91 of the time relay or warp switch C from the power supply line 34 through conductor 95, rock arm 93, terminal 94, a conductor 143, and a branch 96 thereof, through coil or element 91 and resistance D to conductor 90. When the movable rock arm 93, after an interval of time controlled by the resistance D is swung out of the position shown in Fig. 2 by the spring 93c due to the movable leg of the thermostatic member 92 entering the hole 93a in the rock arm, connection with the terminal 94 is broken and the other end of the rock arm moves into engagement with another terminal or contact member 97, whereupon a circuit is completed through conductor 98 to the relay coils E and F, and contactors 175, 176, 177, 186 of relays P, Q, R, S, as will hereinafter be more fully explained. When this happens, a suitable alarm device will be actuated and an attendant, after remedying the cause of the failure to start, can again reset the rock arm 93 manually into the position shown in Fig. 2. A time relay of any other suitable construction may be employed, if desired.

When the relay coil N is energized by means of the relay coil M and the parts operated thereby, the movable contact member 85 is drawn into engagement with the terminal 56 connected with the conductor 52 leading from the battery 30. Current, consequently, passes to a conductor 100 which leads to a terminal 101 adapted to cooperate with a movable contact or switch member 102 actuated by means of a solenoid coil 103. The conductor 100 also connects to one end of this coil 103 and of a similar coil 104, the other ends of both of which are grounded. The coil 103 in addition to actuating the switch member 102, also has its core connected to a spark retard device or lever 105 of any usual or suitable construction, the spark retard member 105 being arranged to be moved into a spark retarding position when the coil 103 is energized. The other coil 104 has its core connected to a combined throttle and choke actuating mechanism, which may, for example, be constructed as shown in Fig. 1 and which includes a rock shaft 106 suitably mounted on the engine. The core of the solenoid 104 is connected with a lever 104a, mounted to rotate freely about the rock shaft 106. The other end of the lever 104a is connected with a rod 104b which is in turn connected with a choke lever 13 of the carburetor 14.

The movement of the lever 104a in a direction to actuate the choke lever causes this lever to engage an arm 9 secured on the rock shaft 106 and to rock the shaft 106. Another arm 8 also secured on the rock shaft 106 is connected with a rod 19 connected to the throttle lever 20. Consequently, when the coil 104 is energized, it actuates the choke 13 and also closes the throttle to the extent desired for starting. Upon deenergizing the coil 104, a spring 7 serves to return the choke and throttle levers to their normal running positions, and the throttle may, if desired, be left under control of a governor (not shown) as is customary in stationary engines. In place of a choke valve, any other means may be employed to provide for an increased supply of fuel to the engine during starting, and such means may be actuated through the medium of the relay N in any suitable manner.

As soon as the spark is retarded by the action of the core of the solenoid 103, the switch member 102 also completes a circuit through conductor 107 to a relay 108 actuating a switch member 109 which connects the terminals of two conductors 110 and 111, the conductor 110 leading to a terminal of a battery 112, the other terminal of which is grounded, and the conductor 111 leads to the starting or cranking motor 17, the other terminal of which is also grounded. If desired, current can, of course, be conducted from the battery 30 to the starting or cranking motor 17 in place of employing two separate sources of power, as indicated in the drawings. By means of this arrangement, the spark will positively be retarded before the cranking motor is started.

Since it is desirable to operate the starting motor for limited periods of time in an intermittent manner, the other terminal of the solenoid or coil 108 is connected by means of a conductor 115 to the conductor 74 which leads to the cam 76 of the cycle timing motor 78. This cam intermittently makes and breaks the circuit leading from the conductors 78 and 115 to the ground, and consequently, the time interval during which the starting or cranking motor 17 is supplied with current is controlled by the cam 76, although the solenoid coils 103 and 104 are continuously energized so long as current is supplied to the coil N during the starting period, so that the throttle, choke and spark retarding devices remain in operation continuously during the period that the cranking motor is being intermittently operated.

As has been stated, the closing of the circuit through the relay coil L also serves to energize the relay coil J, which causes its movable contact member 53 to contact with the terminal 51 which is connected to the power supply line 52. The contact member 53 is connected by means of conductor 119 to suitable devices which supply ignition to the engine and open the fuel and water valves 15 and 16 respectively. The conductor 119 connects with an ignition coil 120 of the ignition device 21, for supplying the low tension winding of the coil with current from the supply line 52 and this low tension circuit is completed to the ground through a conductor 121 leading to a make-and-break device 122. Since the make-and-break device and ignition coil may be of any usual and well known construction, no further details of the same are shown in the drawings. When a magneto (not shown) is used, it is synchronized with battery ignition, each system operating a set of spark plugs and the engine is started and run on a dual ignition system.

The coil J preferably effects the opening of the fuel valve 15 and the water valve 16 by means of solenoids including coils 132 and 133. One end of each coil is connected to a conductor 134 connecting with the conductor 119, and the other ends of the coils are grounded.

Starting

The mechanism thus far described is constructed to start the operation of the engine automatically upon the closing of the master switch 25 or hand switch 29. Briefly stated, this is effected by closing a circuit from the supply line 34 through the movable contact member 35 associated with the relay coil E, to relay coils M and L. Relay M, when thus energized, in turn energizes coils K, O and N. Relay K forms a ground connection for the cranking cycle timing motor 78 and coil O, when energized, forms a ground for the time relay or warp switch C through the adjustable resistance D, during the cranking period of the engine, and thus establishes a cranking time or period of the desired duration, for example, from three to five minutes. When the relay coil N is energized, it closes circuits to place the throttle valve into a starting position, to actuate the choke and to retard the spark. When the spark is in retarded position, the cranking or starting motor circuit is completed so that cranking of the engine begins. The energizing of the relay coil L supplies current to the relay coil J during the starting and running. By energizing the relay coil J, ignition is supplied to the engine from the ignition coil or magneto, and the fuel and water valves are opened. In addition to these operations, a post stop solenoid A is energized while cranking motors are operating, so that this solenoid re-sets a post stop delay switch as will be hereinafter more fully explained.

Run

When the engine reaches a speed at which it may be considered to have been started, such, for example, as about 150 R. P. M., the speed controlled switch 62 is opened and de-energizes the relay coil M. This in turn permits the movable contact member 40 to move into open circuit position out of engagement with the terminal 70, and this in turn breaks the circuit to the relay coils K, O and N, and also de-energizes the post stop reset solenoid A. When the relay coil K is de-energized, the cycle timing motor 78 may continue to operate for a short interval of time by means of current supplied to this motor through a second cam 136 driven thereby and through which a circuit to the ground is completed by a branch conductor 137. This cam finally stops the motor 78 by breaking the path of current to the ground, when the other cam 76 is in a position almost ready to complete a circuit to the solenoid 108. This is for the purpose of reducing the time required to start the engine, so that when the starting circuits are completed, the cycle timing motor will only run for an instant to complete a circuit to operate the cranking motor.

When the relay coil O is de-energized, the circuit through the warp switch C is interrupted, by breaking the circuit including the conductor 90. The movable contact member 84 of the relay O, consequently, makes contact with a terminal 140, to which conductor 141 is connected which leads to one end of the coil 139 of a retarded relay or warp switch T. The other end of the coil 139 is connected by means of conductor 142 to a resistance U with which another conductor 143 connects to the coils of relays P, Q, R and S, which serve the purpose of actuating an annunciator, in the event that one or more of a number of conditions with relation to the operation of the engine are not as they should be. The operation of this part of the system will be hereinafter explained.

When the engine is running, the coil N becomes de-energized due to the de-energizing coil M. This stops the cranking of the engine, allows the spark to advance, the throttle to open wide, and the choke to release and the further control of the throttle is then taken care of by means of the engine governor, which is not shown.

While the engine is running normally, the relay L remains in operation, and with it the relay J controlled thereby. The coil of the warp switch T and resistance U also remains in the circuit during the normal operation of the engine.

Normal stop

In order to prevent damage to the engine for reasons hereinbefore stated, by a sudden breaking of the ignition circuit, special means are provided for continuing the operation of the engine at low speed for a short interval of time after the master switch 25 or the hand-operated switch 29 is opened. When these switches are opened to interrupt the supply of current to the conductor 34, the supply of current to the relay coil L is also interrupted, which causes its movable contact member 41 to move out of engagement with the terminal 43 and into engagement with the terminal 42. This interrupts the supply of current to the relay coil J, and thus shuts off the ignition as well as the fuel and water valves. By engagement with the terminal 42, the movable member 41 supplies current from the supply line 68 to a conductor 144 leading to a time relay or warp switch B, which is somewhat similar in construction to the warp switch C which has been described. The conductor 144 is connected to a rock arm or movable contactor 145 which is normally held in engagement with a contact 146 by a thermostatic member 147. The circuit from the contact 146 to the ground is completed through a coil or heating member 148. When this member becomes heated, it causes the legs of the member 147 to separate, and when the movable leg enters the aperture or recess 145a of the rock arm 145, a spring 145b moves the rock arm out of engagement with the contact 146. It will now be seen that this rock arm 145 will be reset into the position shown in Fig. 3 by means of the post stop solenoid A, which is so formed that when energized, its core moves downwardly against the rock arm 145, thus restoring it to the circuit closing position shown.

The contact member 146 is also connected by means of a conductor 149 to the coils G and H of a pair of relays, the other ends of these coils being grounded. By energizing the relay coil G, the movable contact member 50 thereof is drawn into engagement with a terminal 49 which is connected by means of conductors 48 and 47 to the relay coil J, thus restoring the movable contact member 53 associated with this coil J into contact with the terminal 51. By again energizing the coil J, the ignition circuit to the engine is again rendered operative and the fuel and water valves 15 and 16 are opened. It will, of course, be understood that the re-energizing of the coil J through the medium of the coil G is effected substantially simultaneously with the de-energizing of the relay coil J by the medium of the relay coil L, so that there is no interruption in the operation of the engine.

By energizing the relay coil H through the time relay or warp switch B, current is conducted from the supply line 52 through conductor 55, terminal 51, movable contact member 59 and a conductor 150 to a relay coil 152, the other end of which is grounded, as indicated at 153. The core of the solenoid 152 is connected to a lever 154, which is also free to swing about the rock shaft 106, Fig. 1. When the lever 154 is thus swung by the solenoid 152, it engages an arm 155 secured to the rock shaft and thus causes the rock shaft to swing in a direction to swing the outer end of the arm 8 downwardly and thus move the throttle lever into substantially closed position. Consequently, the engine will idle or run at slow speed while the throttle is in this position, thus allowing parts of the engine to cool somewhat.

The time relay or warp switch B may be set for any desired time interval during which the engine operates at a low speed, thus greatly reducing the momentum of movable parts of the engine. After this brief interval, which may, for example, be approximately three-fourths of a minute, the coil or element 148 has heated the thermo-responsive member 147 sufficiently so that the rock arm 145 is disengaged thereby and moves out of contact with the terminal 146. This interrupts the flow of current to the relay coils J and H, the de-energizing of the coil J causing the ignition circuit to be broken. This brings the engine to a quiet stop position due to the fact that the heated portions of the engine have been cooled to a temperature at which they will not ignite any combustible mixture entering the cylinders. The various relays will all be de-energized so that the entire system is completely shut down and ready for another start.

Emergency stop

Means are provided for automatically stopping the engine, if some emergency arises which would make it advisable to discontinue its operation. For example, if the temperatures of the circulating water or of the lubricant for the engine become excessive, if the engine operates at an excessively high speed, or if the oil or lubricant pressure becomes too low, it might, of course, result in damage to the engine, if under any of these conditions, the engine were continued in operation. In accordance with this invention, means are provided for automatically interrupting the operation of the engine in the event of any such emergencies, and if desired, an indicator or annunciator may be provided by means of which the reason for the stopping the engine will be clearly indicated. For example, the tachometer or governor diagrammatically represented at 63 in Figs. 1 and 2 may be employed for the purpose of also closing a circuit, in the event that the speed of the engine becomes excessive. For this purpose, the movable switch member 62 may contact with a terminal 160 connected with the conductor 161 and also with another terminal which is connected to the ground, as indicated at 64. 162 represents a thermostatically operated switch subjected to the temperature of the lubricating oil and operating so as to close a circuit from a conductor 163 to the ground. 164 represents a similar switch or instrument subjected to the action of the circulating cooling fluid of the engine so that in case the temperature of the cooling fluid becomes excessive, a circuit will be completed from a conductor 165 to the ground. 166 represents a liquid pressure actuated switch or instrument subject to the pressure of the lubricant and acting to close a circuit between a conductor 167 and the ground in the event that the pressure of the lubricant is insufficient to properly lubricate the engine. Conductors 161, 163 and 165 are respectively connected to relay coils S, R and Q, the other terminals of which are connected by means of conductors 168, 169 and 170 to the conductor 143 from which they receive current from the power main 34 through conductor 95, rock arm 93 and terminal 94 of the time relay or warp switch C.

The energizing of any of the coils S, R, or Q, will cause their movable contacts 172, 173, or 174 to engage terminals 175, 176, or 177, each of which is connected with the conductor 98 which, as has already been explained, is connected to one end of the relay coil E, the other end of which is grounded. The movable contact members of these relays S, R and Q are connected with the power line 34, and consequently, when any of them contacts with its terminal 175, 176, or 177, current is supplied to the relay coil E, thus moving the contact member 35 out of contact with the terminal 36 to interrupt the supply of current to the relay coils M and L. These relays in turn actuate other relays to interrupt either the starting operation or the running of the engine.

In the case of the oil pressure actuated switch 166, it is, of course, obvious that during the starting operation of the engine and during the initial running, the oil pressure will be quite low and, consequently, means are hereby provided for delaying or retarding the shutting down of the engine by means of the oil pressure control switch, until the engine has operated long enough to acquire a sufficient speed to build up the oil pressure to approximately normal. This delay may be accomplished in any suitable or desired manner, and in the construction illustrated, this is done by connecting the conductor 167 with a fixed terminal 178 of a time relay or warp switch T. This warp switch T as shown also includes a thermostatic member 179 which is exposed to heat generated by the coil or element 139. When this element is heated by current conducted to it through the medium of the relay coil O and conductors 141, 142, and 143 through resistance U, as has already been explained, which takes place only after the relay coil O has been de-energized because of the starting of the engine, the movable contact member 179 is moved into engagement with terminal 178. This movable contact or thermostatic member is connected to a conductor 182 leading to one end of the relay coil P, the other end of which is connected by means of a conductor 183 to the conductor 143, which also is connected to the relay coils S, R and Q. When the relay coil P is energized, its movable contact member 185 connected to the power line 34 moves into engagement with the terminal 186 which is also connected with the conductor 98, which supplies current to the relay coil E for the purpose of stopping the operation of the engine, as has already been explained.

Each of the conductors 161, 163, 165 and 182 also continue beyond the relay coils, to which they are connected, to an annunciator for the purpose of actuating signals which will enable an attendant to readily determine the cause for stopping the engine. Any suitable or usual annunciator signal device may be employed and the signal actuating circuit is only shown completed in Fig. 2 in connection with the oil pressure switch 166, since it will be clear that the other circuits of the annunciator from the relay coils S, R and Q will be identical with the one leading from the relay coil P. The conductor 182 thus continues to the magnet or annunciator coil 188, which may actuate any suitable signal drop or indicator device 187 in the annunciator. The other end of each annunciator coil 188 is connected by means of a conductor 189 to a buzzer or signal actuating coil 190 having the usual make-and-break contact 191 which is connected by conductor 192 to the conductor 143. The buzzer coil 190 is thus in series with the annunciator coil 188 and these two coils are connected in parallel with the coil P. Similarly other annunciator coils are connected in parallel with the coils Q, R and S and each of these annunciator coils may similarly be connected in series with a buzzer.

When the engine has been stopped because of actuation of any of the relay coils P, Q, R and S, an attendant can immediately determine the cause of stopping and can manually reset the rock arm 93 of the warp switch C, whereupon the system will again be ready for another starting operation. Any other suitable or desired signal actuating circuit may be employed, or if desired, the annunciator may be entirely omitted. Also other devices than those shown by way of example may be provided for stopping the engine in case of additional emergencies.

The relay coil E, when energized, moves the contact member 35 out of engagement with contact 36, thus interrupting the supply of current from the current supply main 34 to conductor 37 leading to relay coils M, and L, and this in turn causes the starting or running operation to be discontinued. The relay coil E also moves contact member 35 into engagement with a terminal 38, which may be used to actuate an alarm device, for example, through a conductor 39 leading to one terminal of a bell or other alarm device 99, the other terminal of which is grounded.

From the foregoing description, it will be clear that no current will pass through the coil T of the time relay until the relay O has been de-energized, which does not take place until after the engine has been started. The time relay or warp switch T further delays the closing of a circuit through the same for a period of time after this start. This arrangement, therefore, avoids the actuation of any emergency stopping means or the annunciator by means of the oil pressure switch for a short time after the engine has been running, so that the engine will have had ample time to build up the oil pressure to that desired under normal running conditions. The time relay T may be set or selected to operate after any suitable time interval, for example, two minutes after the current is transmitted thereto by the de-energizing of the relay O.

Briefly stated, in case of an emergency, a circuit to the ground is completed by means of any of the emergency devices 63, 162, 164, or 166 or others that may be added to the system, and the corresponding relay coil connected with such device is energized. This in turn causes the relay coils E and F to become energized. The energizing of the relay coil E de-energizes the relay coil L and actuates the alarm 99. The de-energizing of the relay coil L completes the post stop circuit in the same manner as described in connection with the normal stop operation so that the engine is slowed down before being actually stopped. The energizing of the relay coil F causes the movable contact member 195 which is connected to the ground to contact a terminal 196 connected with a conductor 197 which leads to the heating coil or element 91 of the time relay or warp switch C, and thus competes a circuit through this coil without including the resistance D in the circuit. This, consequently, causes the time relay coil or warp switch C to be actuated more rapidly than otherwise, thus moving its movable contact or rock arm 93 into engagement with the terminal 97 to which the conductor 98 is connected. This forms a circuit for a continuous supply of current to the relay coils E and F, causing the relay coil E to close the circuit through the alarm 99 until the master switch 25 is opened.

After the master switch has been opened, the operator should correct the trouble which caused the emergency stop and reset the movable contact member 93 into engagement with the terminal 94, this being preferably accomplished manually. The system is then ready for again closing the master switch 25 or the test switch 29.

*Starting failure*

In the event that the engine fails to start after closing of either of the switches 25 or 29, the circuit established by the energizing of the relay coil O through the resistance D and the time relay coil or warp switch C will eventually cause the movable contact member 93 to move out of engagement with the terminal 94 and into engagement with the terminal 97, after the desired lapse of time during which the starting motor is operating. When the circuit is thus completed through conductor 98 to relay coils E and F, the relay coil F serves no additional purpose, since the contact member 93 has already been moved into engagement with the terminal 97. The energizing of the relay coil E, however, causes the alarm to be sounded and to actuate the relay coil L which establishes the post stop circuit for a brief period of time through the time relay coil B. The entire system is then de-energized, with the exception of the relay coils E and F so that the alarm continues to sound. In the event of the starting failure, the annunciator does not indicate any failure. If the cycle timing motor locates itself the contactors and cam will always be located in some relative position. Should warp switch C operate before cranking has ceased, the cycle timing motor will stop wherever it happens to be when the warp switch C breaks the circuit. Thus this location of the cam and contactor, combined with the alarm operating would indicate starting failure.

The various relays may be conveniently mounted on a single panel 200, as shown in Fig. 1, on which the cycle-timing motor 78 may also be mounted. These parts are not shown in detail on Fig. 1. If an annunciator is employed, this may be arranged in a cabinet 201, as shown in Fig. 1. Any other means for arranging the mounting of these parts may, of course, be employed, if desired.

The system described has the advantage that it is very reliable in effecting a prompt starting of the engine. Under normal conditions the engine is started in a few seconds after the closing of the starting circuits by the master switch. By means of the post stop operation which takes place after the opening of the master switch, the engine is brought to a quiet stop without danger of explosions in the exhaust system, and the operation of the post stop system is entirely automatic, even to the extent of automatically resetting the post stop mechanism after the same has operated. Consequently, the system may operate repeatedly without requiring any attention whatever.

By means of the various emergency stop provisions, damage to the engine is avoided, either during starting or running, and the annunciator or indicator is of great value in enabling the operator to quickly find the cause of stopping. The system has been so designed and constructed as to employ only such devices and instrumentalities which are of strong and rugged construction, thus ensuring positive and reliable operation.

I claim as my invention:

1. The combination with an internal combustion engine, having fuel supply means and an ignition circuit, of a delayed stop system therefor including means for first reducing the supply of fuel to said engine, and means for breaking said ignition circuit, which is operable upon expiration of a period of time after said reduction of fuel supply.

2. The combination with an internal combustion engine, having fuel supply means and an ignition circuit, of a delayed stop system therefor including means for first reducing the supply of fuel to said engine, and a time relay which is energized when said fuel supply is reduced and which after a predetermined interval of time breaks said ignition circuit.

3. The combination with an internal combustion engine, having fuel supply means and an ignition circuit, of a delayed stop system therefor including electrically operated means for reducing the supply of fuel to said engine, and an electrically operated warp switch to which electric current is supplied simultaneously with said fuel reducing means and which after a predetermined interval of time interrupts said ignition circuit.

4. The combination with an internal combustion engine having a throttle and an ignition circuit, of a delayed stop system therefor, including means for first moving said throttle into position to reduce the speed of said engine, and means breaking said ignition circuit after a predetermined time interval following said movement of said throttle.

5. The combination with an internal combustion engine having a throttle and an ignition circuit, of a delayed stop system therefor including electrically operated means for moving said throttle into position to reduce the speed of said engine, a time relay for breaking said ignition circuit, and means for simultaneously supplying electric current to said throttle operating means and said time relay.

6. The combination with an internal combustion engine having means for controlling the speed thereof of a delayed stop system therefor including means for first reducing the speed of said engine substantially to the idling speed, and means operable after expiration of an interval of time following said speed reduction for stopping said engine.

7. The combination with an internal combustion engine having fuel supply means and an ignition circuit, of a delayed stop system therefor including means for first reducing the supply of fuel to said engine, and a time relay including a heating element to which electric power is supplied when said fuel supply is reduced, a thermo-responsive device subjected to said heating element, and means actuated by said device for breaking said ignition circuit after an interval of time.

8. In a control system for an internal combustion engine, the combination of means for automatically starting the engine, of a delayed stop system therefor, including means for first reducing the speed of said engine substantially to the idling speed, means operable after expiration of an interval of time following said speed reduction for stopping said engine, and means actuated by said starting means for again restoring said delayed stop system to a condition to repeat its operation when it is desired to stop said engine.

9. In a control system for an internal combustion engine, the combination of an electric circuit including means which, upon completion of said circuit, act to start the engine and upon breaking of said circuit act to stop said engine, a delayed stop system which is operated upon the breaking of said circuit to continue the operation of said engine for a predetermined time interval at low speed, and means actuated upon completion of said circuit for restoring said delayed stop system to a condition to repeat its operation.

10. In a control system for an internal combustion engine, the combination of an electric circuit including means which, upon completion of said circuit, act to start the engine and upon breaking of said circuit act to stop said engine, a delayed circuit including a time relay and means for continuing the operation of the engine at slow speed, said time relay moving into open circuit position to break said last mentioned circuit after lapse of a time interval, and means actuated by the closing of said first circuit to restore said time relay into circuit closing position.

11. In a control system for an internal combustion engine, the combination of a cranking motor, a circuit which, when closed, supplies current to said cranking motor, motor driven means for supplying current intermittently to said cranking motor, and a time relay for interrupting the supply of current to said cranking motor after a predetermined lapse of time.

12. In a control system for an internal combustion engine, the combination of a cranking motor, a circuit which, when closed, supplies current to said cranking motor, a motor driven timing member in said circuit which intermittently makes and breaks said circuit, and a warp switch including a thermoresponsive element which, after a predetermined lapse of time, interrupts said circuit.

13. In a control system for an internal combustion engine, the combination of means for maintaining said engine in a running condition, a device responsive to the pressure of lubricant supplied to parts of said engine, means connected with said device for immediately operating the engine at idling speed when said pressure becomes low, and a time relay which is energized by said device and which stops said engine by said device for a predetermined period of time.

14. In a control system for an internal combustion engine, the combination of electric devices including a circuit for maintaining said engine in running condition, a device responsive to pressure of lubricant supplied to said engine and which is connected with said circuit to break the same if said pressure is too low, a warp switch which cooperates with said device to delay the action of said device for a predetermined interval of time, and means actuated by said device to operate said engine at idling speed during the delay period controlled by said warp switch.

15. In a control system for an internal combustion engine, the combination of a plurality of devices, each of which is subjected to a different operating condition of the engine, a circuit for each of said devices and which is closed when the device therein is subjected to an abnormal operating condition of the engine, means actuated by any of said circuits when closed to operate the engine at a low speed, and means also actuated by any of said circuits when closed to stop the engine after the same has been operating at low speed for an interval of time.

16. A control system for an internal combustion engine having an ignition system, a throttle, a choke and a starting motor, said control system including an operating circuit having a circuit closing device which is closed when the engine is to be started and operated, a relay having a coil and a circuit closing device operated thereby which when the coil is de-energized, closes said circuit, said operating circuit including a relay which closes a second circuit, a starting cycle timing device in said second circuit which intermittently makes and breaks a third circuit including said starting motor, a second relay in said first circuit for applying said choke and opening said throttle, a third relay in said first circuit for closing a circuit including said ignition system, and a fourth relay in said first circuit which closes a fourth circuit including a heating element of a warp switch, a fifth circuit including the coil of said first relay and which may be closed by said warp switch after a predetermined time interval to interrupt said starting circuit, and means for interrupting the supply of current to said second and fourth relays when the engine has started to run.

17. A control system for an internal combustion engine having an ignition system, a fuel supply system and a starting motor, said control system including an operating circuit, a circuit closing device therefor which is closed when the engine is to be started and operated, means in said circuit for placing said ignition system and fuel supply system into condition for starting said engine when said circuit is closed and for rendering said ignition system and fuel supply system inoperative when said circuit is broken, said circuit also including actuating means for intermittently supplying current to said starting motor for a predetermined interval of time, a post stop operating circuit including a warp switch having a heating element and a circuit closing member, means actuated by the closing of said operating circuit for placing said last mentioned circuit closing member into circuit closing position, means actuated by the opening of said starting circuit for supplying current to said heating element and for simultaneously closing said post stop circuit, means in said post stop circuit for placing said ignition system into operation and for setting said fuel supply system to supply a small quantity of fuel to said engine, said post stop circuit being broken to stop the engine when the heat from said heating element causes said post stop circuit closing member to be moved into open circuit position, and means for interrupting the starting functions when the engine has started to run.

18. In a control system for an internal combustion engine, the combination of an electric circuit including means which, upon completion of said circuit, act to start the engine and upon breaking of said circuit act to stop said engine, a delayed stop system which is operated upon the breaking of said circuit to continue the operation of said engine for a predetermined time interval at low speed, said delayed stop system including a warp switch having a heating element and a thermo-responsive element which is subjected to heat from said element and after a period of time effects the stopping of the engine, a resistance in series with said heating element, a delayed stop circuit including said resistance and said heating element and which is completed when said first circuit is broken, and emergency stop means which operate when an abnormal condition arises in the engine, said emergency stop means comprising a circuit including said heat element and excluding said resistance, for effecting a quick stop in case of emergency.

19. A control system for an internal combustion engine having an ignition system, a fuel supply system and a starting motor, said control system including an operating circuit having a circuit closing device which is closed when the engine is to be started and operated, a relay having a coil and a circuit closing device operated thereby which, when the coil is de-energized, closes said operating circuit, said operating circuit including means for placing said ignition system and fuel supply system into condition for starting said engine when said circuit is closed and for rendering said ignition system and fuel supply system inoperative when said circuit is broken, means operated when the engine attains running speed for placing said ignition system and fuel supply system into running positions, an emergency stop device which includes a second circuit which is completed thereby when an abnormal condition arises in the engine, and which circuit includes said relay, for breaking said operating circuit, and means for operating said engine for a limited period of time at low speed after actuation of said emergency stop device.

20. A control system for an internal combustion engine having a choke, a throttle and a starting motor, said control system including an operating circuit which is closed when it is desired to start the engine, means actuated by said circuit for operating said starting motor, means actuated upon the closing of said circuit for applying said choke and opening said throttle, a post stop circuit which is closed when said operating circuit is opened and which includes a solenoid, means operated by said last mentioned solenoid for moving said throttle substantially into closed position without applying said choke, and a time relay for breaking said post stop circuit after a desired interval of time.

21. A control system for an internal combustion engine having a choke, a throttle and a starting motor, said control system including an operating circuit which is closed when it is desired to start the engine, means actuated by said circuit for operating said starting motor, a solenoid in said operating circuit and having its core connected with said choke to apply the same, a part movable in one direction by said solenoid when the same actuates said choke for moving said throttle into open position, and a post stop circuit which is completed when said operating circuit is broken and which includes a solenoid having a core adapted to actuate said part to move said throttle into substantially closed position without applying said choke.

22. A starting system for an internal combustion engine having a starting motor, said system including an operating circuit which is completed when it is desired to start the engine, a cycle timing motor having a pair of cams, a second circuit for supplying current to said timing motor when said operating circuit is completed, a starting motor circuit including said starting motor and which is intermittently completed and broken by one of said cams, means for interrupting said circuit to said cycle timing motor when the engine has started to run, and a circuit through said other cam which may continue to supply current to said cycle timing motor after said first timing motor circuit is broken, and which is broken by said second cam when said first cam is almost in position to supply current to said starting motor.

ELWOOD T. LARKIN.